United States Patent
Hull et al.

(10) Patent No.: US 6,211,460 B1
(45) Date of Patent: Apr. 3, 2001

(54) MULTI-DEVICE YOKE FOR A SURFACE RACEWAY SYSTEM

(75) Inventors: Eric G. Hull, Madison; Dennis P. Revlock, Sr., Eastlake; Renee Bruno Carter, Munson, all of OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 09/213,655

(22) Filed: Dec. 16, 1998

(51) Int. Cl.[7] .................................................. H02G 3/14
(52) U.S. Cl. .............................. 174/48; 174/66; 220/241
(58) Field of Search ................. 174/48, 58, 66; 220/3.8, 241

(56) References Cited

U.S. PATENT DOCUMENTS

| | | | |
|---|---|---|---|
| 4,443,654 | * 4/1984 | Flachbarth et al. | 174/48 |
| 4,612,412 | * 9/1986 | Johnston | 174/58 X |
| 4,875,871 | 10/1989 | Booty, Sr. et al. . | |
| 4,875,881 | 10/1989 | Caveney et al. . | |
| 4,993,970 | * 2/1991 | Littrell | 174/48 X |
| 5,010,211 | * 4/1991 | Bartee | 174/48 |
| 5,013,260 | 5/1991 | Caveney et al. . | |
| 5,114,365 | * 5/1992 | Thompson et al. | 174/66 X |
| 5,143,868 | 9/1992 | Caveney et al. . | |
| 5,396,027 | 3/1995 | Zemen, Jr. . | |
| 5,418,328 | 5/1995 | Nadeau . | |
| 5,486,650 | 1/1996 | Yetter . | |
| 5,594,208 | 1/1997 | Cancellieri et al. . | |
| 5,629,496 | 5/1997 | Navazo . | |
| 5,670,743 | 9/1997 | Welch et al. . | |
| 5,715,450 | * 2/1998 | Chan et al. | 174/66 |
| 5,981,875 | * 11/1999 | Kesler et al. | 174/66 |

OTHER PUBLICATIONS

Brochure: "Pan–Way Surface Raceway System" PANDUIT®, [Brackets and Covers] pp. 42 and 43 (undated prior art).
Brochure: "Two–Piece Multiple Channel Nonmetallic Surface Raceway", pp. B4 1 to B4 27 (undated prior art).
Brochure; Hubbell "Systems That Deliver" (undated prior art).
Brochure: Workstation—UTP & Fiber, Leviton "Quickport™ Flush Mount Products" (undated prior art).
Brochure: Wall Plates—Pass & Seymour legrand "Index" pp. S1—S3 (undated prior art).

* cited by examiner

Primary Examiner—Dean A. Reichard
(74) Attorney, Agent, or Firm—Jones, Day, Reavis & Pogue

(57) ABSTRACT

A device yoke comprising a mounting plate having at least two openings to accommodate at least two different types of electrical devices and a device box attached to the mounting plate. The device box includes at least a side wall and a bottom wall for separating the wires to be routed into the box from the wires not routed into the box. The multi-device yoke can be combined with a multiple device cover plate to form a multiple device mounting system. The multi-device yoke and multiple device mounting system could optionally include terminal lug means attached to the mounting plate to provide a grounding lug to meet other electrical standards.

8 Claims, 3 Drawing Sheets

MULTI-DEVICE YOKE FOR A SURFACE RACEWAY SYSTEM

BACKGROUND OF THE INVENTION

The present invention is directed toward the field of raceway or wire duct systems. In particular, a multiple device yoke is described for use in a raceway system having both high voltage power wires and low voltage communication wires. The multiple device yoke provides access to both high voltage and low voltage within a single yoke while maintaining channel separation of the high voltage and low voltage wires within the raceway system.

The need for varying types of electrical wiring in residential and commercial buildings have steadily increased. Electrical wiring is used to supply electricity to power electrical devices within a home or business and is used to carry low voltage signals that are used in providing many services such as telephone, intercom, cable television, video, music, alarm, internet access, and other computer network services. Surface raceway systems provide a convenient way to route electrical wiring both in new construction and in remodeling projects.

Access to multiple types of wiring within the raceway system is often needed at a single location. For example, a computer may require access to both power and telephone or other communication wires at a single location so that the computer can receiver power and can connect to an intranet or internet.

Presently known methods provide access to multiple types of electrical wires by using separate device yokes having a single type of electrical connector for each type of electrical wire accessed. If both low and high voltage wires need to be accessed at the same locations, at least two single device yokes are needed. For example, a single device power yoke with a power receptacle would be employed to provide access to power, a single device telephone yoke with a telephone connector would be provided to provide access to telephone services, and a single device cable television yoke with a cable television connector would be provided to provide access to cable television services. This method may be functional but suffers from many disadvantages. Space is wasted. This method is more expensive. The material cost is higher and it takes longer and is more expensive to install. Also, this method is less appealing aesthetically.

Presently known raceway systems that include both high voltage and low voltage wires in the same raceway system also use wide diameter raceways and typically divide the raceway system into separate channels of equal width. These raceway systems have channel widths that are wider than the device yokes and connectors that provide access to wires within the channel. Because power receptacles are wide, the channels containing power wires are wide. This results in lower utilization efficiency of the raceway system. Most often the high voltage channel does not have to be as wide as the power receptacle to house all of the power wires. The low voltage channel, on the other hand, generally requires more space in the raceway than the high voltage power wires. Therefore, greater utilization efficiency could be achieved if some of the space allocated to the high voltage wires could be utilized for low voltage wires. In addition, to meet Canadian standards, device yokes must also include grounding lugs which are not available in presently known raceway systems.

Therefore, there remains a need in this art for a multiple device yoke that can provide access to both high voltage power and a low voltage communication wire. There remains a more particular need in this art for a multi-device yoke that allows the end user to install low and high voltage connectors side by side using only one yoke. There remains a more particular need for a multiple device yoke that has an attached box to isolate the high voltage lines from the low voltage lines. There remains a more particular need for a multi-device yoke that has an attached box base which can be removed if not needed. There remains a further need for multiple device yoke that includes a grounding lug to provide extra safety. There remains a need for a multiple device yoke that can be used in narrow width raceway systems such as those that are around 4 inches or narrower. There remains a need for a multiple device yoke that can accommodate the apportioning of more than half of the raceway system to the low voltage communication wires while providing space for a high voltage power outlet.

SUMMARY OF THE INVENTION

The present invention overcomes the problems noted above and satisfies the needs in this field for a multi-device yoke for a raceway system. An important feature of the multi-device yoke is the capability to run both high voltage and low voltage connectors in the same yoke without the need for an additional box base. The multi-device yoke has an attached divider and box base so that power connectors such as duplex or GFCI connectors can be installed in one section and communication connectors such as voice or data jacks can be installed in another section per National Electrical Code requirements.

The device yoke comprises a mounting plate having at least two openings to accommodate at least two different types of electrical devices and a device box attached to the mounting plate. The device box includes at least a side wall and a bottom wall for separating the wires to be routed into the box from the wires not routed into the box. The multi-device yoke of the present invention can be combined with a multiple device cover plate to form a multiple device mounting system.

The multi-device yoke and multiple device mounting system could optionally include terminal lug means attached to the mounting plate to provide a grounding lug to meet other electrical standards.

As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE PREFERRED EMBODIMENT

Figure 1:
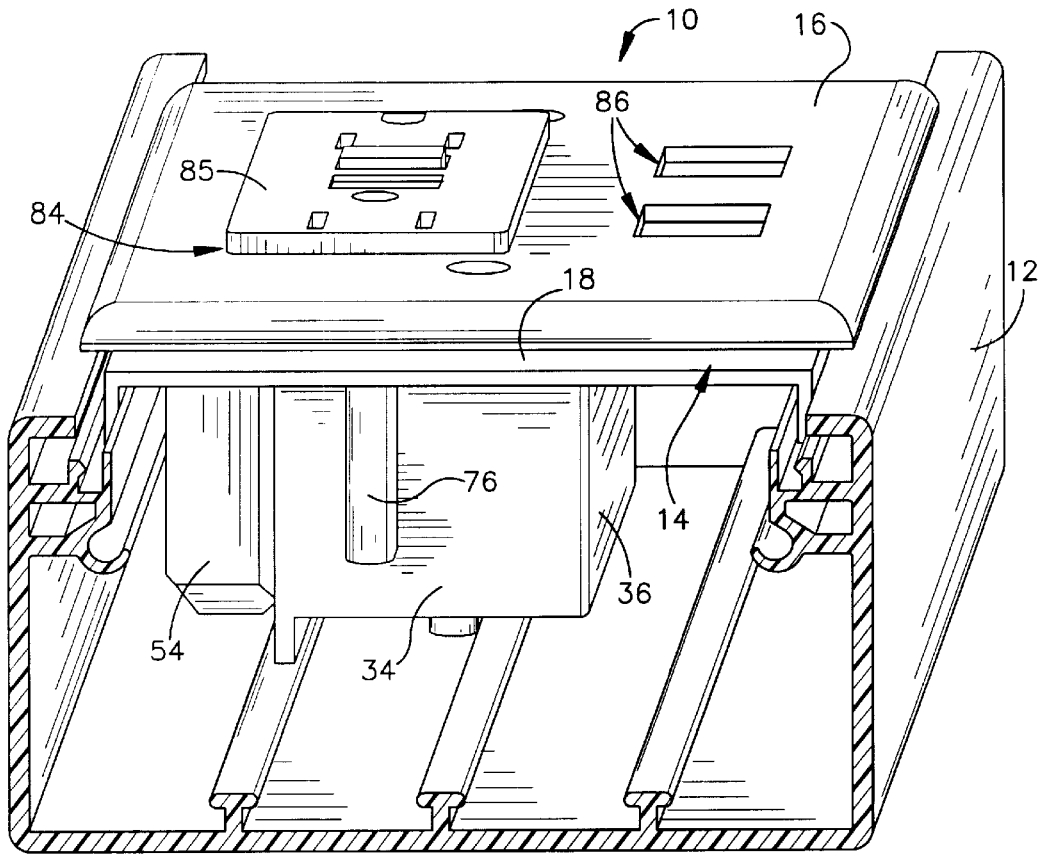
FIG. 1 is a side elevational view of the multi-device mounting system installed in a raceway system.
Figure 2:
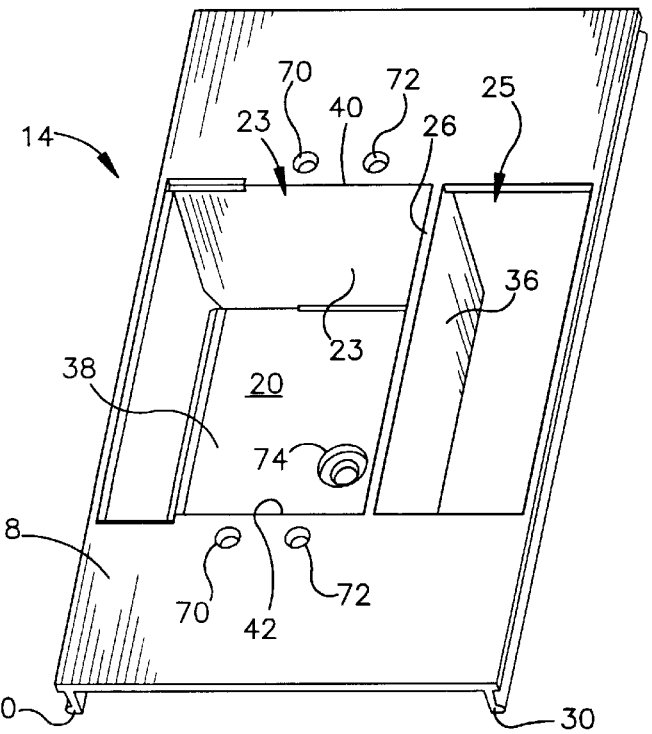
FIG. 2 is a top view of an embodiment of the multi-device yoke.
Figure 3:
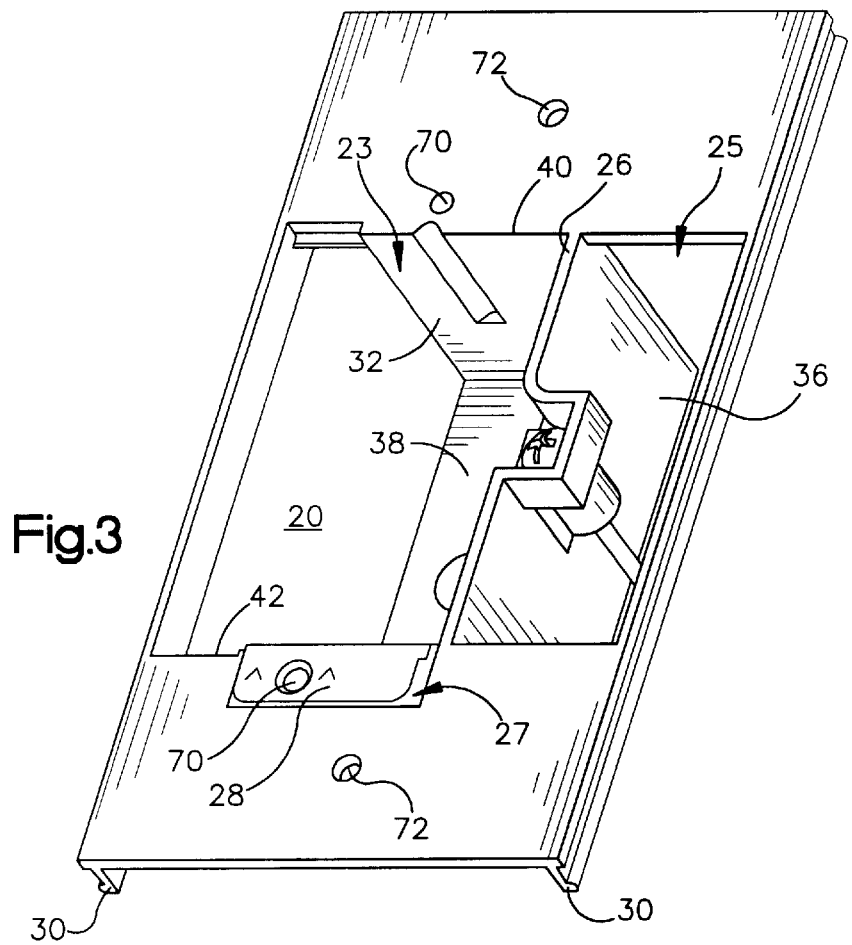
FIG. 3 is a top view of an embodiment of the multi-device yoke having a recessed area for the installation of a ground lug, a grounding lug, and a grounding screw.
Figure 4:
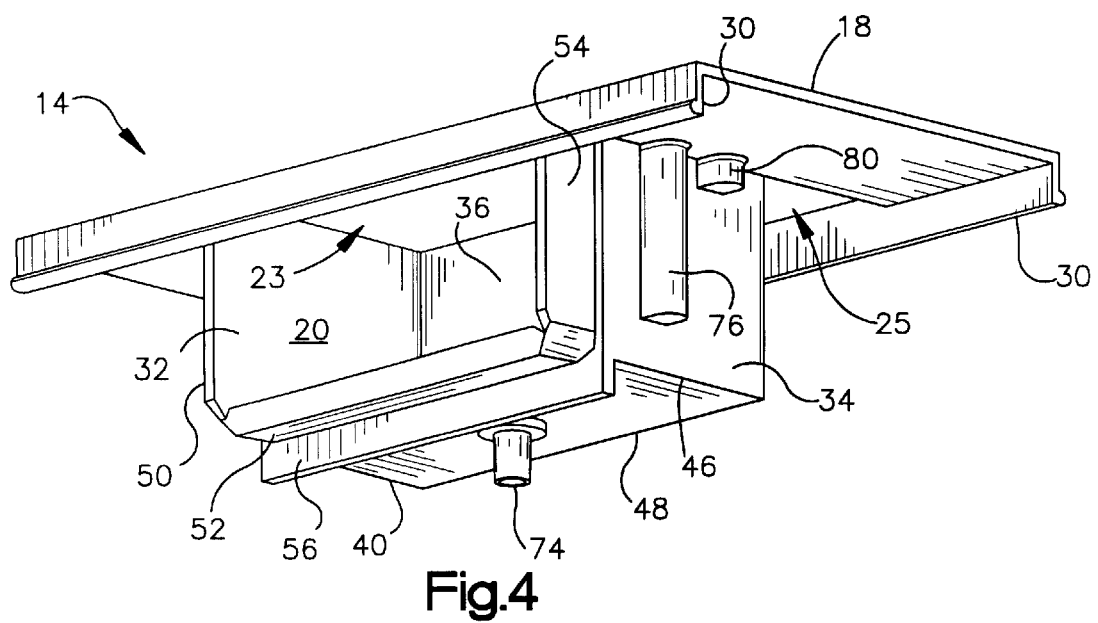
FIG. 4 is a side view of an embodiment of the multi-device yoke.
Figure 5:
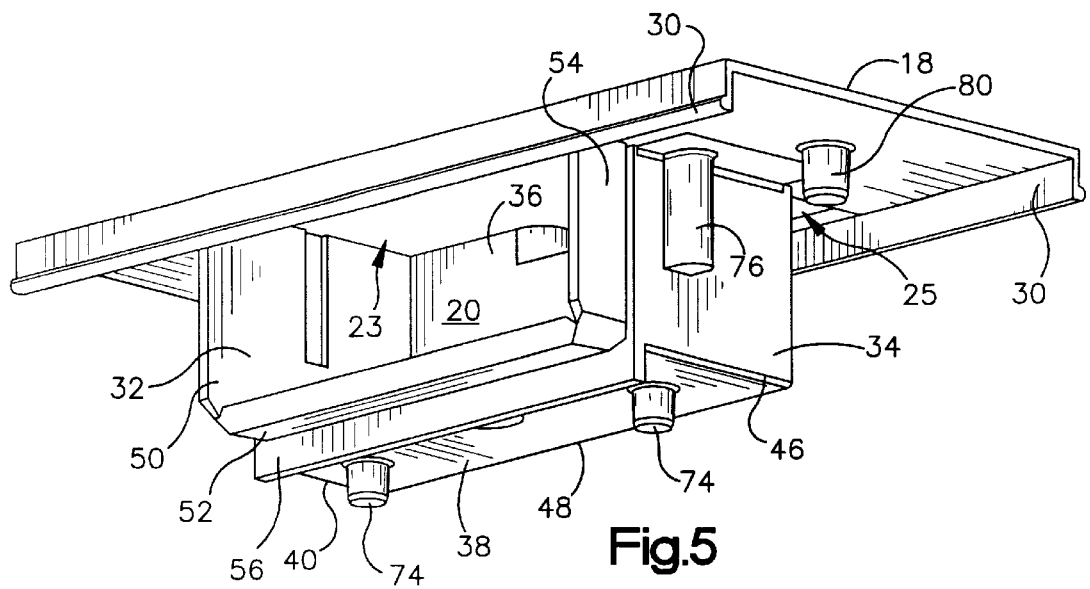
FIG. 5 is a side view of an alternate embodiment of the multi-device yoke.

Referring now to the drawings, FIG. 1 sets forth a preferred embodiment of the multi-device mounting system 2 of the present invention. The multi-device mounting system 2 is adapted for use in raceway or wire duct systems 8 used in new or remodeling construction when high voltage and low voltage electrical wires need to be routed to different areas of a building. The multi-device mounting system 2 is applicable to many raceway systems but is particularly useful in narrow raceway systems such as systems four inches wide or narrower where real estate is especially at a premium. The multi-device mounting system 2 comprises a device yoke 10, which provides a mounting location for both high voltage devices such as GFCI or duplex receptacles and low voltage devices such as telephone, cable television or other low voltage connectors, and a cover plate 36.

As best seen in FIGS. 2–5, device yoke 10 comprises a mounting plate 12 for use in attaching device yoke 10 to sections of surface raceway 8 and a device box 20 for accommodating and providing isolation for a high voltage outlet device to be mounted onto device yoke 10. Mounting plate 12 is provided with a high voltage opening 14 for providing a high voltage outlet device access to high voltage power lines within the raceway system, a low voltage opening 16 for providing low voltage outlet devices access to low voltage lines within the raceway system, and a divider section 15 which is formed between and divides high voltage opening 14 and low voltage opening 16. Mounting plate 12 is optionally provided with a recessed area 18 which provides a convenient location for the inclusion of a grounding lug 13 to device yoke 10 to facilitate the meeting of Canadian electrical standards. The preferred device yoke 10 is fabricated from a plastic material such as PVC. from an injection molding process in which the device box 20 is formed integral with the mounting plate 12. Mounting plate 12 optionally includes flanged surfaces 22 which are adapted for attaching device yoke 10 to raceway system 8.

Device box 20 provides an isolated location for the mounting and wiring of a high voltage outlet device such as a GFCI or duplex power receptacle. Device box 20 in the embodiment shown includes a front wall 22, a back wall 24, a side wall 26, and a bottom wall 28. Side wall 26 preferably is aligned with and extends perpendicularly from divider section 15 of mounting plate 12. Front wall 22 and back wall 24 preferably are aligned with and extend perpendicularly from front and back edges 17 and 19, respectively. Bottom wall 28 attaches to bottom edges 23, 25, & 27 of front wall 22, back wall 24, and side wall 26, respectively. Front wall 22, back wall 24, side wall 26, and bottom wall 28 combine to form a partially enclosed region that is preferably enclosed on four of six sides. Front, back and bottom walls 22, 24, & 26, each also include extended break-a-way walls 29, 30 & 32 that removably attach to outer edges of front, back and bottom walls 22, 24, & 26 to provided user selectable access to the interior of device box 20. Divider wall 34 may optionally be provided to extend perpendicularly and lengthwise from bottom wall 26 to provide channel isolation to a surface raceway system. Front wall 22, back wall 24, and side wall 26 are sized so that they surround and at least partially isolate a high voltage device from wires that run within the raceway system but are not run into the device box but provide space for the routing of wires underneath the box within the raceway system.

The device yoke 10 may include a pair of device mounting openings 40, cover plate mounting openings 42, and yoke device mounting opening 44. Device mounting openings 40 provide a mechanism for mounting a high voltage device to the device yoke 10. Device mounting openings 40 could optionally be pre-threaded for attachment by screws. Also device mounting openings 40 could open into a device attachment cavity within device attachment member 48.

Similarly, cover plate mounting openings 42 provide a mechanism for mounting cover plate 34 to the device yoke 10. Cover plate openings 42 could optionally be pre-threaded for attachment by screws. Also cover plate mounting openings 42 could open into a cover plate attachment cavity within cover plate attachment member 50.

Figure 6:
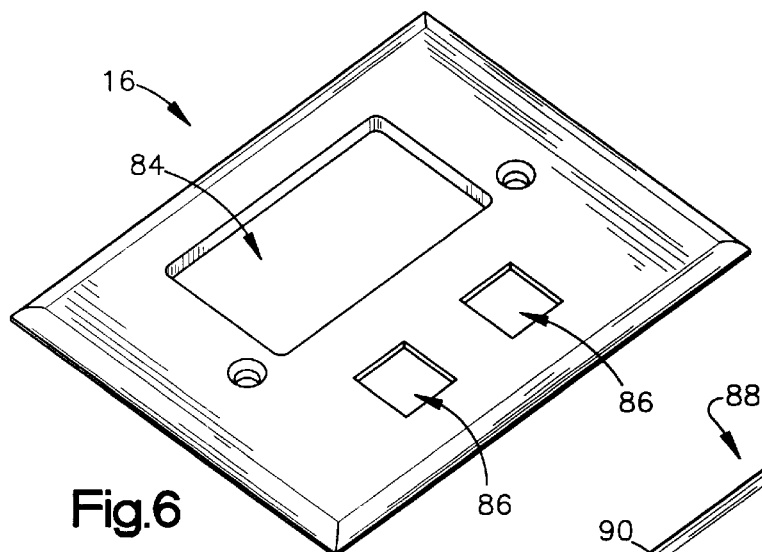
FIG. 6 is a top view of a cover plate for the multi-device mounting system having a GFCI mounting area.
Figure 7:
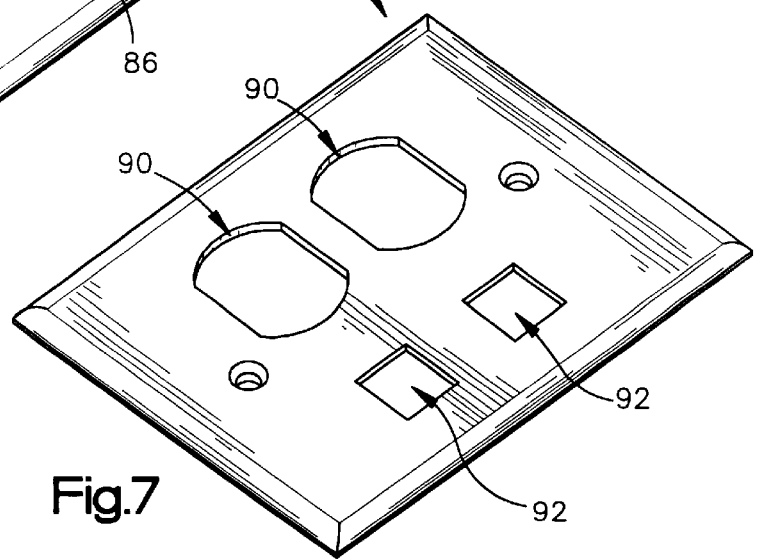
FIG. 7 is a top view of a cover plate for the multi-device mounting system having a duplex receptacle mounting area.

The multi-device mounting system 2 also includes a choice of cover plates 34 for covering high and low voltage devices mounted within the device yoke 10. In the embodiment shown in FIG. 6, cover plate 36 provides an opening 52 for a GFCI device on one side and openings 54 for a plurality of voice/data communication devices on the other side. In the embodiment shown in FIG. 7, cover plate 38 provides opening 56 for a duplex receptacle on one side and openings 58 for a plurality of voice/data communication devices on the other side. It is to be understood that one of skill in the art could modify the cover plate configuration in a variety of different ways to take advantage of the separate high voltage and low voltage access provided by the device yoke 10 of the present invention.

In use both low and high voltage wires can be routed within a raceway system. In a location where device receptacles are desired, a device yoke can be mounted onto the raceway system. Wires within the raceway system can be positioned around and underneath the device box as needed and the wires to be connected to device receptacles routed so that there is access to them through the appropriate outlet openings. Both high voltage and low voltage devices can be connected to the appropriate wires and the devices mounted to the device yoke. The cover plate is then installed over the devices and the device yoke using screws or other fastening means to complete the installation.

Having described in detail the preferred embodiment of the present invention, including its preferred manner of use, it is to be understood that this invention could be carried out with different elements and steps. This preferred embodiment is presented only by way of example and is not meant to limit the scope of the present invention which is defined by the following claims.

What is claimed:

1. An apparatus for use with a raceway containing high voltage wires and low voltage wires, said apparatus comprising:

a cover plate configured to span an open front of the raceway, said cover plate further being configured to support a high voltage electrical device in an installed position projecting from a rear side of said cover plate into the raceway, and simultaneously to support a low voltage electrical device in an installed position projecting from said rear side of said cover plate into the raceway; and a dual device yoke configured to be mounted on said rear side of said cover plate, said yoke including a divider wall structure configured to project into the raceway between the high voltage electrical device and the low voltage electrical device, whereby said yoke functions to isolate the high voltage electrical device and corresponding high voltage wires from the low voltage electrical device and corresponding low voltage wires within the raceway.

2. An apparatus as defined in claim 1 wherein said divider wall structure includes a bottom wall configured to extend beneath the high voltage electrical device at a location spaced upward from a bottom wall of the raceway so as to isolate the high voltage electrical device from wires extending along the bottom wall of the raceway.

3. An apparatus as defined in claim 1 wherein said divider wall structure is configured to surround the high voltage electrical device on three sides of the high voltage electrical device, and to expose the high voltage electrical device on a fourth side of the high voltage electrical device.

4. An apparatus as defined in claim 3 wherein said fourth side of the high voltage electrical device extends alongside an adjacent side wall of the raceway.

5. An apparatus as defined in claim 1 wherein said yoke is configured for attachment to the raceway in an installed position in which said yoke supports said cover plate on the raceway.

6. An apparatus as defined in claim 5 wherein said yoke includes a mounting plate configured to be fastened to said rear side of said cover plate.

7. An apparatus as defined in claim 6 wherein said mounting plate has flange portions configured to engage free edge portions of the raceway for said attachment of said yoke to the raceway.

8. An apparatus as defined in claim 7 wherein said mounting plate has a recessed area configured to receive a grounding lug mounted on said yoke.

* * * * *